United States Patent [19]
Scordato

[11] 3,933,048
[45] Jan. 20, 1976

[54] PIPETTES
[75] Inventor: Emil A. Scordato, Bronxville, N.Y.
[73] Assignee: Medical Laboratory Automation, Inc., Mount Vernon, N.Y.
[22] Filed: Feb. 12, 1974
[21] Appl. No.: 441,765

[52] U.S. Cl. ............................................. 73/425.6
[51] Int. Cl.² ......................................... B01L 3/02
[58] Field of Search ..................... 73/425.4 P, 425.6

[56] References Cited
UNITED STATES PATENTS

| | | | |
|---|---|---|---|
| 3,646,817 | 3/1972 | Hinchman et al. | 73/425.6 |
| 3,766,785 | 10/1973 | Smernoff | 73/425.6 |
| 3,834,590 | 9/1974 | Robinson | 73/425.6 |

*Primary Examiner*—S. Clement Swisher
*Attorney, Agent, or Firm*—William P. Keegan

[57] ABSTRACT

A pipette having a first piston means for aspirating a predetermined volume of liquid into a liquid reservoir, and a second piston means for delivering a relatively high volume of air to expel liquid from the liquid reservoir.

17 Claims, 6 Drawing Figures

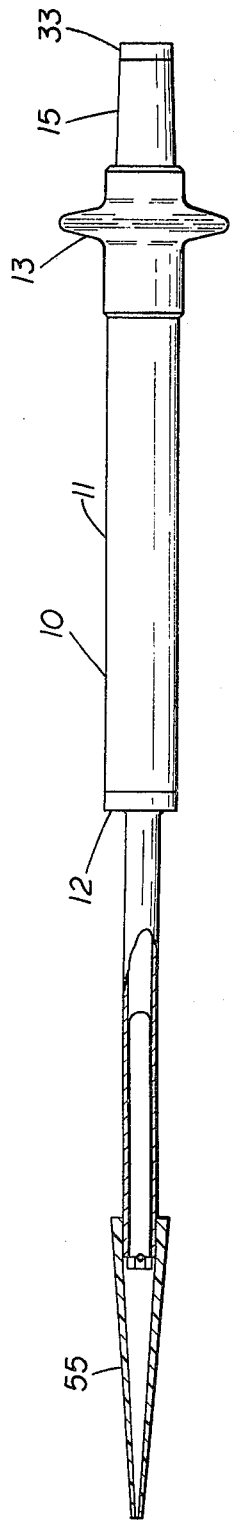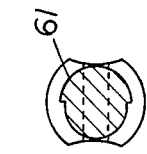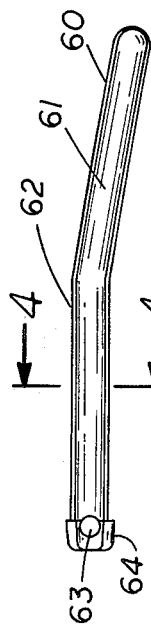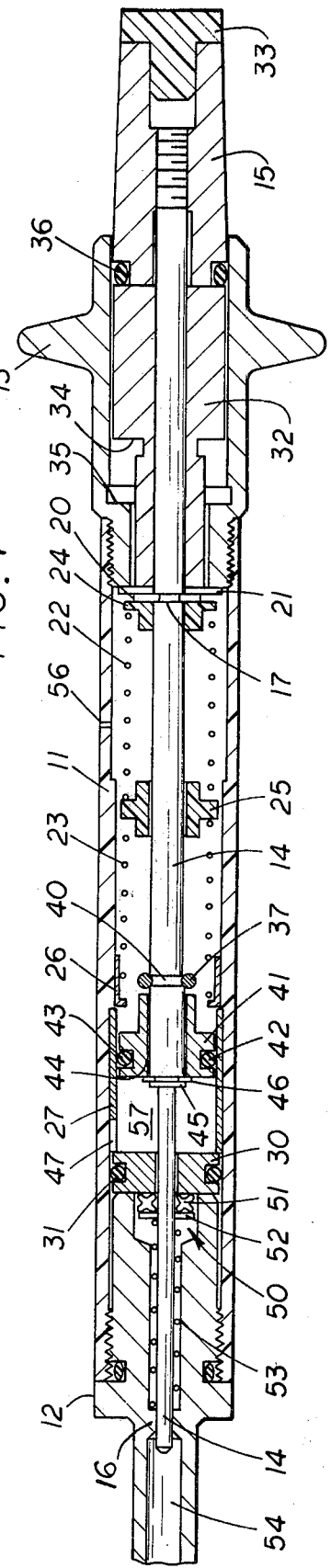
FIG. 1
FIG. 2
FIG. 3
FIG. 4

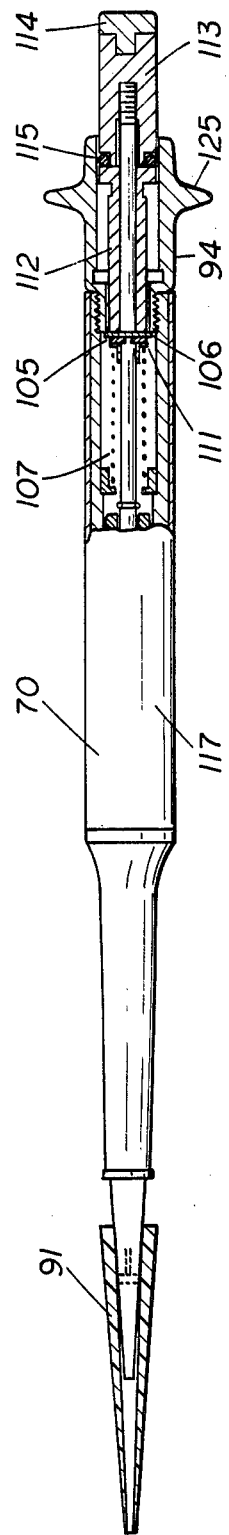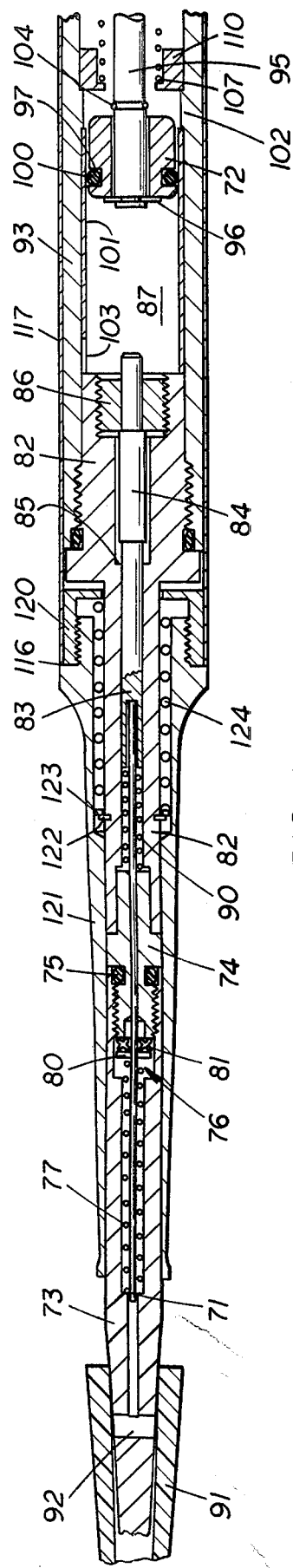

PIPETTES

BACKGROUND OF THE INVENTION

The invention relates to pipettes and especially to pipettes that insure the discharge of the entire volume of liquid aspirated during the pipette filling operation.

In recent years manual pipettes have largely supplanted mouth pipettes in laboratory procedures. By the term manual pipette is meant a plunger type pipette which is used simply by driving a piston between two limiting positions to aspirate a liquid being pipetted into a reservoir, usually a disposable unit forming no part of the pipette proper, and thereafter to expel the liquid from the reservoir. Usually the depression and release of the piston will draw a quantity of liquid into the reservoir and a second depression of the piston will expel the liquid, although pipettes have been provided in which depression of the piston will fill the reservoir and release of the piston will expel the liquid. The reasons for the current popularity of manual pipettes are manifest. For example, the manual skill required to pipette a precise quantity of liquid is less demanding with manual pipettes since the precision is built into the pipette during the manufacture thereof. Moreover, since manual pipettes are generally used with disposable pipette tips into which the liquids are drawn, the pipette itself need not be cleaned or sterilized between uses since the liquid never is drawn into the pipette proper.

The utility of many laboratory procedures requires the precise measurement of a small volume of liquid. Thus, it is not uncommon to require the accurate dispensing of volumes of less than ten milliliters. Even for larger volumes it is desirable that the accuracy of the measurement be assured and that it be repeatable over many pipetting operations. The design of manual pipettes generally assures that a precise predetermined volume of liquid is aspirated into the pipette reservoir, but the discharges of that precise volume is not always achieved. Quite often, a small quantity of the liquid remains after the discharge stroke of the piston is completed. The liquid remaining may be a droplet formed at the orifice of the pipette tip which is not blown out with the rest of the liquid. This often results because the air in the reservoir above the liquid level is a compressible fluid that cannot positively expel all of the liquid when the pipette piston is depressed to expel the liquid. Attempts to minimize the consequences of the compressible air column lead to a pipette design that reduces the air volume between the piston and the liquid level in the reservoir. But this means that the piston is near the liquid level and perhaps will be contacted by the liquid in some operations. This, of course, is undesirable since cross contamination between samples being pipetted can occur. Also, the orifice of the pipette tip can be designed to minimize the formation of droplets of liquid thereon. Thin layers of liquid may ahdere to the walls of the liquid reservoir, i.e., the disposable pipette tip. This tendency is greatly reduced by the use of non-wetting plastics for pipette tips.

It will be appreciated from the foregoing, however, that the accurate measurement of liquids in manual pipettes is an important consideration in the use of such pipettes for critical laboratory procedures. This is especially true where small volumes, in the order of ten milliliters or less, are being measured. In such cases, the volume of a droplet remaining on a pipette tip will be an appreciable part of the volume initially aspirated. So much so has this become a consideration that a great deal of inventive effort has been directed towards the provision of pipettes that will expel essentially all of the liquid initially drawn into the pipette.

These efforts have generally resulted in a pipette having two different strokes, one for filling the pipette reservoir with a measured volume of a liquid, and a second longer stroke for discharging the liquid. In a manual pipette, the piston is usually spring biased to a normal or home position and moved from that position, against the force exerted by the spring, to a position determined by a stop. This movement expels a fixed volume of air from the pipette top so that when the piston is restored to its home position by the action of the spring a like volume of liquid is aspirated into the pipette tip. The liquid is then expelled by a second depression of the piston. If the stop referred to is not a fixed stop, but a stop formed by a relatively stiff spring, then the filling stroke of the piston would take place against the force exerted by a relatively light spring and would be arrested when the technician tactilely encountered the heavy spring. The second or expelling stroke would simply be made with sufficient force to overcome the effects of the stiff spring. It should be clear that such an arrangement requires discernment on the part of the technician since the accuracy of the pipetting operation depends on stopping the first or filling stroke the instant the stiff spring is felt. Any compression of the stiff spring on the filling stroke destroys the accuracy of the pipette. Obviously, such a solution is not satisfactory.

Others have overcome the deficiencies of the pipettes just alluded to by making the stop that controls the filling stroke a fixed stop. But then, before the discharge stroke is made, an element of the pipette is rotated so that the stop can be cleared or by-passed as the piston is driven a longer distance to discharge the liquid contained in the pipette tip. This, also, is an unsatisfactory solution since it imposes an additional burden on the technician in that he has to perform the awkward task of rotating the pipette piston before each discharge and filling stroke. When a large number of pipetting operations are to be performed, this becomes arduous and annoying.

SUMMARY OF THE INVENTION

It, therefore, is the object of the present invention to provide an improved pipette which assures the complete discharge of all the liquid aspirated into the pipette reservoir.

It is another object of the invention to provide a pipette having a fixed stroke in which more air is expelled from the pipette during a discharge stroke than is aspirated by the measuring piston during a "filling" stroke.

It is still another object of the invention to provide a pipette in which that volume of air expelling liquid from the pipette is not dependent on the volume displaced by the measuring piston.

Yet another object of the invention is to provide a pipette in which the displacement of a measuring plunger controls the quantity of a liquid aspirated into the pipette and in which the aspirated liquid is expelled from the pipette by a pulse of high pressure air.

Another object of the invention is to provide a pipette in which the air pressure in a fluid reservoir is reduced to a level which allows a pre-determined volume of liquid to be aspirated into the reservoir, and in which the liquid is expelled from the reservoir by a large volume of high pressure air.

In carrying out the invention there is provided a pipette having a fixed stroke for both filling and discharging the pipette. The filling stroke aspirates a predetermined volume of liquid into the pipette by moving a measuring piston between two limiting positions in a small volume plenum. The volume of liquid aspirated depends on the area and the stroke of the piston. The discharge stroke provides, in addition to the air trapped in the small volume plenum, a large quantity of air from a second plenum which assists in blowing the aspirated liquid from the pipette. The second plenum is separated from the small volume plenum by valve means which close the fluid passageway between the two plenums during a filling stroke, and which open the fluid passageway during a discharge stroke so that a piston moving in the second plenum can move air from the second to the small volume plenum.

Features and advantages of the invention may be gained from the foregoing and from the following description of a preferred embodiment of the invention.

In the drawing:

FIG. 1 is a side elevational view, partly in section, of a pipette embodying the present invention;

FIG. 2 is a sectional view taken lengthwise through the pipette of FIG. 1;

FIG. 3 is a front elevational view of a nozzle insert;

FIG. 4 is a sectional view taken along line 4—4 of FIG. 3;

FIG. 5 is a side elevational view, partly in section, of a small volume pipette embodying the present invention; and FIG. 6 is a sectional view taken lengthwise through the pipette of FIG. 5.

DETAILED DESCRIPTION OF THE INVENTION

Reference is now made to FIG. 1 which illustrates one embodiment of the invention. The pipette 10 comprises basically a tubular barrel 11, the forward or bottom end of which is internally threaded to accommodate a nozzle member 12. The opposite end of barrel 11 also is internally threaded so that a terminal member 13, which is externally threaded as shown, can be connected securely to the barrel. A delivery piston 14, the displacement of which causes the drawing of the liquid being pipetted into the nozzle or preferably into a disposable tip press fitted onto the nozzle, is shown extending from within nozzle member 12 to a plunger knob 15 slideably positioned at the extreme end of terminal member 13. In broad principal, depression of knob 15 and piston 14 (i.e., movement thereof to the left in the drawing) expels a quantity of air from a nozzle so that when the knob is returned to its normal position, as by a biasing spring as will be described hereinafter, a like quantity of liquid, into which the nozzle member is inserted, will be aspirated into the nozzle member. As mentioned, a disposable tip is preferably used so that it is inserted into the liquid and the liquid is drawn up into the tip only. In this way the pipette itself is never touched by the liquid, and thus can never be contaminated thereby or cause cross-contamination when different samples, especially of biological fluids, are being pipetted.

At its forward end piston 14 is guided in nozzle member 12 by the annular guide ring 16 formed internally in member 12 during its manufacture.

Towards its other end where it initially passes through member 13, piston 14 is provided with a groove 17 into which fits a snap washer 20. A bearing washer 21 is placed between snap washer 20 and the end surface of member 13. The spring means, comprising compression springs 22 and 23, bias piston to the position illustrated which is determined by the location of groove 17 and washer 20. While one spring could have been used instead of the two shown, the latter arrangement is preferred since a single long spring would have a tendency to bow when being compressed and rub against the barrel or piston to cause a squeaking sound. Springs 22 and 23 bear against nylon bushings 24 and 25, which fit loosely over piston 14, and against a flanged cylinder 26. The cylinder in turn bears against tube 27 and the tube against the circumferentially grooved disk 30. An "O" ring 31 is mounted in groove of disk 30, the disk itself being provided with a central aperture through which piston 14 passes with ample clearance. It will be apparent that disk 30, tube 27, and cylinder 26 can simply be fitted within barrel 11 since they all are held snugly in position by the action of springs 22 and 23.

Within member 13, piston 14 passes through a metering block 32 which is restrained against lengthwise travel along piston 14 by its engagement with washer 21 and knob 15, the latter of which is threaded or forced down on piston 14 until block 32 is moved into abutting relationship with washer 21. A button 33 is pressed into the end of knob 15 to give it a finished appearance. The button may be of a plastic material and color coded to indicate the volumetric capacity of the pipette. In this particular, the barrel 11 may also be of a plastic material and similarly color coded for the same purpose. Also, an "O" ring 36 serves as a low friction bearing member guiding knob 15 along the internal diameter of member 13. The "O" ring is not intended to provide an air-tight seal.

It will be clear from the description so far that the piston 14 will be in the one limiting position illustrated by the action of springs 22 and 23. When the piston is depressed, as by pressure on knob 15 the piston will move until the end 34 of the wider diameter portion of block 32 strikes the shoulder 35 formed on the inside of member 13. Thus the volumetric capacity of the pipette will be determined by the area of piston 14, or more precisely, since the diameter of the piston may be different along its length, the area of the delivery part of piston 14 within nozzle 12 and the length of the stroke of the piston. The latter, of course, is determined by the abutment of the end 34 of block 32 with shoulder 35. To vary the capacity of the pipette, a different block (not shown) would be used, the different block having the same overall length as block 32 but having a wider diameter part of shorter or longer length. In this way a different length stroke would be provided.

Attention is now directed to those components of the pipette which insure that all the liquid aspirated into the pipette will be expelled during a discharge operation. A sealing ring 37 is positioned in annular groove 40 formed on the circumference of piston 14. Spaced a short distance along piston 14 from ring 37 is the overblow piston 41. This piston 41 is formed with an annular groove 42 which receives an "O" ring 43 that provides an air-tight seal as piston 41 slides along tube 27. Overblow piston 41 is provided with an axial bore 44 through which piston 14 can slide with sufficient clearance to allow air to flow from one end of piston 41 to the other. A snap ring washer 45 on piston 14 and washer 46 bear against overblow piston 41 and move it to the right (as viewed in the drawing) to the position shown. It will be observed that piston 41 moves longitudinally relative to piston 14 between positions determined by snap washer 45 and seal ring 37. The reason for this will become clear as the description progresses, as will the reason for a notch or keyway slot 47 formed in tube 27.

A check valve 50 in the form of a quad ring 51, washer 52, and compression spring 53 is provided between piston 41 and disk 30. Spring 52 is a relatively light spring the only purpose of which is to cause quad ring 51 to make an air tight seal between piston 14 and disk 30. However, the spring is weak enough to allow pressure on the remote side of disk 30 to compress spring 53 thus opening valve 50 and allowing air to flow down around piston 14 and out nozzle 12.

Attention is now directed to nozzle insert 60 the details of which are shown in FIGS. 3 and 4. It will be appreciated that in the ordinary pipette, the volume of liquid aspirated will be equal to the volume of air initially expelled from the pipette chamber 54 by movement of the delivery piston, and this is equal to a volume equal to the area times the stroke of piston 14. This is a theoretical result since, due to the compressibility of the air in chamber 54 more liquid may enter the pipette tip than is expected. Also, since the liquid is expelled from the tip by the column of air between the liquid and the tip of the delivery piston, compression of this column of air may result in failure to expell all of the liquid. The greater the ratio between the volume swept through by piston 14 and the initial volume of chamber 54, the more accurate will be the correspondence between the volume of the expelled air and the aspirated liquid, and also the expulsion of all of the aspirated liquid. Nozzle insert 60 reduces the volume of chamber 54 and, therefore, it increases the ratio just mentioned. Insert 60 is initially bent as shown, so that when it is placed in the bore of nozzle member 12, it will be frictionally held there. The reduction of the volume of chamber 54 is brought about without bringing the tip of piston 14 near the level of liquid drawn into the pipette, so there is little liklihood of contaminating the pipette. Air will enter and leave chamber 54 by flowing along the reduced diameter semi cylinder 61 of stem 62 and through transverse aperture 63 in head 64. Insert 60 has the further advantage that it reduces the liklihood of a pipetted liquid inadvertently entering the pipette. Moreover, it protects the tip of nozzle member 12 from damage should the pipette be dropped.

Having thus described the construction of the pipette, its operation will now be considered. Pipette is generally grasped by a technician with his four fingers surrounding barrel 11 and his thumb resting on knob 15. It is, of course, immaterial how the pipette is grasped, and any method comfortable and convenient to the technician will suffice. Knob 15 is depressed until end 34 of block 32 strikes shoulder 35 thus driving piston 14 down into chamber 54 to supplant a predetermined column of air. The tip of the pipette 10 or preferably a disposable tip 55 mounted on nozzle 12 is then inserted into the liquid being pipetted. Thumb pressure is released from knob 15 whereupon springs 22 and 23 moves piston 14 to the right (as shown in the drawing) until washer 21 strikes the end of member 13. As piston 14 moves to the right liquid is aspirated into pipette tip 55. At the end of its rightward travel, the parts of the pipette will be as illustrated and a predetermined volume of liquid will be in pipette tip 55.

The interior of the pipette to the right of disk 30 will contain air at atmospheric pressure since that portion of the pipette to the right of seal ring 37 is not of air tight construction. In fact, a small aperture 56 could be provided in barrel 11 to insure that air does leak into the interior of the pipette. Note especially that piston 41 is spaced from seal ring 37 so that air will leak past seal ring 37 and through bore 44 of piston 41 to the air chamber 57 between disk 30 and piston 41. Note also that check valve 50 prevents any air leakage around delivery portion of piston 14.

Now to discharge the liquid from pipette tip 55, knob 15 is again depressed. Initially, overblow piston 41 does not move because of its free fit on piston 14 and because of the relatively snug air-tight engagement with the internal wall of tube 27 provided by "O" ring 43. During this initial relative movement between piston 14 and overblow piston 41, washer 45 moves away from the left hand end of piston 41. However, as piston 14 continues its movement to the left, seal ring 37 engages the right hand end of piston 41 and thereafter, overblow piston will move as a unit with piston 14. Chamber 57 is now sealed, and air pressure therein builds up as the volume of the chamber is decreased by the leftward movement of overblow piston 41. At a position in the leftward movement of piston 41, the pressure in chamber 57 reaches a level sufficient to overcome the force exerted by spring 53 thus opening check valve 50 and allowing the compressed air in chamber 57 to expand into chamber 54 and expel the liquid in tip 55. Just prior to piston 41 reaching the bottom of its stroke, "O" ring 43 on overblow piston 41 reaches notch 47 thus permitting the air pressure in chamber 57 to equalize with that in the interior of the pipette around springs 22 and 23. Of course, as pressure in chamber 57 is restored to normal, check valve 50 closes. This particular feature is significant not so much when liquid is being discharged from the pipette as when piston 41 is being depressed prior to aspirating liquid into pipette tip 55. In this latter operation, if the air pressure in chamber 54 has not returned to atmospheric pressure (as by chamber 54 being in communication with the chamber 57 containing high pressure air) at the time tip 55 is inserted in the liquid being pipetted, an inexact volume of liquid would be aspirated into the tip. This for the reason that liquid would not enter the tip until the piston has moved a distance sufficient to reduce the air pressure in chamber 54 to atmospheric pressure.

After piston 14 reaches its terminal position as determined by the engagement of member 32 with shoulder 35, thumb pressure is removed from knob 15 and springs 22 and 23 return piston 14 to its other limiting position. During the initial movement of piston 14, overblow piston 41 does not move since it must first be engaged by washers 45 and 46 which at this point are separated from the piston. During the relative movement which brings washer 46 into engagement with piston 41, seal ring 37 is moving away from the opposite end of piston 41 to the relative position shown in the drawing. Piston 14 and piston 41 continue their movement in unison until such time as washer 21 engages the end of member 13. The pipette is then in its quiescent state as shown and ready for further use.

The effectiveness of the present invention may be summed up in general terms as follows. The volume of liquid drawn into the pipette tip is controlled by the displacement of a small volume of air. That is, by the volume represented by the area and stroke of the delivery portion of piston 14 whereas the expulsion of the liquid from the pipette tip is effected by the displacement of a comparatively large volume of air, i.e., by the volume determined by the area and stroke of overblow piston 41. Overblow piston 41 has an area many times the area of piston 14, hence, much more air is available to expel the liquid from the pipette tip. In the ordinary pipette the volume of liquid aspirated is controlled by the area and stroke of a piston, e.g., piston 14, and the expulsion of the liquid is effected by the displacement of the same piston. In certain of the prior art disclosures, the stroke of the piston is increased when expelling the liquid, but this is not as efficient as increasing the effective area of the piston many times as in the present invention.

Attention is now directed to FIGS. 5 and 6 which show a different embodiment of the invention. The embodiment shown is particularly useful for extremely small volume pipettes, for example, pipettes having a delivery of 10 micro liters or less.

The pipette 70 is shown comprising two separate pistons as in the previous embodiment, a metering or delivery piston 71 and an overblow piston 72. Now, however, the pistons are carried on separate plungers for a reason that will become clear as the description progresses. The distal end of piston 71 is fitted within the narrow bore of nozzle member 73 and guided within the central aperture of connecting member 74 which is threaded into nozzle member 73. A seal 75 insures that the joint is air-tight. A eheck value 76 comprising a compression spring 77, a washer 80, and a guad ring 81 is provided for a purpose later described. For the present, it will suffice to say that quad ring 81, when urged against member 74 by spring 77, provides an air-tight seal between piston 71 and member 74. The opposite end of member 74 is brazed into the piston stroke controlling member 82. Member 82 is provided with a central aperture which is stepped to provide three different diameter bores. The smallest bore, which is of a diameter greater than that of the aperture in member 74 carries plunger rod 83 into which delivery piston 71 is press fitted. Further on, the aperture diameter is increased to accommodate the wider diameter portion 84 of plunger 83, a stop shoulder 85 being formed at the point the aperture diameter changes. The plunger 83, after being reduced to its original diameter next passes through an adjusting nut 86 which is threaded into member 82 and projects into chamber 87. A compression spring 90 placed between the ends of members 74 and 83 urges plunger 83, and piston 71, to an initial position determined by the engagement of the end of plunger portion 84 with the face of adjusting nut 86. By turning nut 86 in member 82, the initial position of plunger 83 can be controlled and calibrated. The other terminal position of plunger 83 is determined by the engagement of the other end of plunger portion 84 with stop shoulder 85. Since this position is fixed it is apparent that the stroke of plunger 83, and piston 71, is determined by the adjusted position of nut 86. Consequently, the volume capacity of pipette 70 is determined by the stroke of piston and its area.

Since the present pipette is intended for such minute volumes, i.e., from 1 to 10 microliters, the diameter and stroke of piston are equally minute. And, of course, the bore in nozzle member 73 is equally minute. This generally will prevent the use of an insert similar to insert 60 used in the FIG. 2 embodiment, but if desired a suitable insert could be provided. However, the distal end of nozzle member 73 can itself be likened to an insert to be placed in pipette tip 92. Thus, member 73 terminates in a solid cone, and the bore of the member extends only as far as transverse aperture 93.

A pipette barrel 93 is internally threaded at one end for connection to member 82 and at its other end for connection to terminal member 94. Within barrel 93 overblow piston 72 is slideably positioned at the end of plunger 95 and is restrained thereon by a washer 96 snapped into a groove formed on plunger 95. Piston 72 is provided with an annular groove 97, which accommodates an "O" ring 100 that makes an air-tight seal with the inner surface of tubular member 101 which extends between the end of member 82 and an internal ridge 102 in barrel 93. A notch or keyway slot 103 is provided in tubular member 101. A seal ring 104 is mounted in an annular groove on plunger 95 a short distance from the end of piston 72.

Further along plunger 95, a "C" washer 105 is snapped into a groove machined on plunger 95 and a bearing washer 106 is placed between it and the end of terminal member 94. A compression spring 107 placed between spring scats 110 and 111, the latter bearing against washer 105, therefore urges plunger 95 to its limiting position determined by the engagement of washer 106 with the end of member 94. The plunger 95, after passing through a filler piece 112 is threaded into, or otherwise connected to, thumb knob 113. The end of knob 113 may be finished in any suitable way or it may be fitted with a plastic button 114 which may be color coded to indicate the volumetric capacity of the pipette. An "O" ring 115 is provided so that knob 113 slides smoothly within member 94, but it is not intended, nor should it, provide an air-tight seal.

Inasmuch as many pipettes, especially those used for biological purposes, are provided with disposable tips so that pipetted liquids never enter the pipette itself, the pipette illustrated with the present embodiment of the invention is also shown with a tip removal mechanism. It is to be understood, however, that such mechanism need not be provided on the pipette. It should also be understood that such tip removal mechanism could be provided on the pipette illustrated in FIGS. 1 and 2.

The tip removal mechanism 116 comprises a sleeve member 117 that is slideably positioned over barrel 93. An internally threaded flanged cylinder 120 is brazed or otherwise secured to the inside of sleeve member 117, and into it is threaded the tip removing member 121. A snap washer 122 fitted into a groove on the external surface of member 82 together with washer 123 serves as a seat for compression spring 124. The spring urges the tip removal mechanism 116 to the right (as viewed in the drawing) until sleeve member 117 strikes the lip of terminal member 94. The engagement of the flange of cylinder 120 with member 82 could, in the alternative, serve as the stop for mechanism 116.

In operation, the pipette 70 is grasped in the palm of the hend with four fingers around sleeve member 116 and the thumb on button 114, and a disposable tip 91 is placed on nozzle member 73. Knob 113 is depressed by thumb pressure driving plunger 95 downwardly (to the left in the drawing). Plunger 95 continues downwardly, its end striking the end of plunger 83 and driving plunger 83 downwardly until the end of portion 84 strikes shoulder 85 and arrests the movement of both plungers. Thus, piston 71 is driven a distance determined by the movement of portion 84 between the face of adjusting nut 86 and shoulder 85. The pipette tip is then inserted into the liquid to be pipetted. When thumb pressure is released, both plungers return to the positions shown in the drawing, plunger 84 being urged by spring 90, and plunger 95 by spring 107. When plunger 83 returns to its biased position, a volume of liquid is aspirated into the pipette tip commensurate with the stroke and area of piston 71.

The air in chamber 87 will be atmospheric pressure since the pipette to the right of the chamber is not air tight, and air can seep past piston 72 in view of the clearance between plunger 95 and the piston. To insure that air does leak into the interior of the pipette, a small aperture may be provided in the wall of barrel, but in general it will not be necessary.

Now, when knob 113 is depressed to expel the liquid from pipette tip 91, the initial movement of plunger 95 moves seal ring 104 into engagement with the end of piston 72, thus closing off chamber 87 from the interior of the pipette and atmospheric air. Consequently, as plunger 95 continues to the left accompanied by piston 72 driven by seal ring 104, the air trapped in chamber 87 is compressed and its pressure builds up. At some point in the build up, depending on the force exerted by spring 77, check valve means 76 is opened and the air from chamber 87 is released through nozzle member 73 to expel the liquid from tip 91. It does not matter whether this occurs before or after piston 71 is moved since its movement contributes very little (due to its small area and stroke) to the expulsion of the liquid. However, the normal practice will be to maintain thumb pressure until the movement of the plungers is arrested by the engagement of portion 84 and shoulder 85. By this time, "O" ring 100 would have been brought into alignment with notch 103 to relieve the pressure in chamber 87 and allow spring 77 to close check valve 76. When thumb pressure is released, spring 90 returns plunger 83 to its normal position, as shown, and spring 107 returns plunger to its normal position. Since seal ring 104 moves away from piston 72, chamber 87 is again in communication with the interior of the pipette and atmospheric pressure.

To remove the pipette tip 91, the technician, without removing his finger grip around sleeve 117, places his thumb nail under the projecting rim or arm 125 of member 94 and moves his thumb upwardly. This action moves the entire pipette, including nozzle member 73 on which tip 91 is mounted, to the right while the tip removal mechanism remains stationary. Thus, the end of tip 91 is brought into contact with the end of member 121 and pushed off nozzle member 73 by continued upward movement of the pipette proper.

Having thus described the invention, it is clear that many apparently widely different embodiments thereof could be provided without departing from its spirit and scope. Many different constructions could be made in the internal configuration of parts or certain features could be omitted while retaining the general principle of operation. For example, instead of overblow piston 41 being slideable relative to seal ring 37 so as to allow air to enter chamber 57 when piston 41 is in its normal position, a notch in tube 27, similar to notch 47, could be provided for the same purpose, in which case the piston would be firmly secured to plunger 14 in an air-tight relationship, and seal ring 37 omitted. Or, the wide diameter of piston 41 could be extended lengthwise with respect to the pipette, and "O" ring 42 replaced by an "O" ring mounted on the internal wall of barrel 11. In this latter arrangement, notches similar to notch 47 and the additional one mentioned above would be provided on piston 41 to provide air leaks past the "O" ring mounted on barrel 11 at both extremes of travel of piston 41. Also, the pipette could be configured so that by depressing the thumb knob, liquid is aspirated into the pipette or tip, and by releasing the knob the liquid is expelled from the pipette or tip. Of course, whether or not a disposable tip is used is optional with the user, and will generally depend on the use to which the pipette is put. A check valve of different configuration could be used in place of valve 50. Or a washer-like member could be placed between quad ring 51 and disk 30. This member would have an area relatively much greater than that of the part of quad ring 51 subject to the pressure buildup in chamber 57. The member would be provided with an "O" ring that formed a face seal against disk 30. The arrangement would be such that the force needed to crack check valve 50 would be distributed over the relatively large area of the member rather than over a small part of the quad ring. The invention could also be used in automatic or power actuated pipettes in which the pistons are moved by power driven cams, or the like, rather than in manual pipettes as described. Therefore, it is intended that the specification and the drawing be interpreted as illustrative rather than in a limiting sense.

What is claimed is:

1. A pipette for aspirating a predetermined volume of liquid into a reservoir and thereafter discharging said liquid from the reservoir, said pipette comprising, a first air chamber, a first piston movable in said air chamber, said piston being movable a set distance to aspirate a predetermined volume of liquid into a reservoir, a second air chamber, a second piston movable in said second air chamber, said second piston being movable to expel liquid from the reservoir, the piston area of said second piston being substantially greater than the piston area of said first piston, actuating means movable between two limiting positions for moving said first and said second pistons in said air chambers, a first fixed stop for arresting said actuating means in one limiting position, a second fixed stop for arresting said actuating means in the other limiting position, and means for connecting said second air chamber to said first air chamber as said actuating means approaches said first stop whereby air in said second air chamber aids in expelling liquid from the reservoir and for separating said air chambers when said actuating means is arrested by said first fixed stop so that the volume of liquid aspirated into the reservoir is controlled only by the movement of said first piston in said first air chamber.

2. A pipette according to claim 1 wherein said connecting means comprises spring biased check valve means and wherein movement of said second piston means in said second air chamber increases the pressure therein to open said check valve means, whereby the increased pressure air flows into said first air chamber to expel aspirated liquid from the reservoir.

3. A pipette for aspirating a predetermined volume of liquid into a reservoir and for discharging the liquid therefrom, said pipette comprising means for forming a first air chamber and a second air chamber, a fluid passageway connecting said chambers, first piston means movable between two limiting positions and within said first chamber for aspirating a predetermined volume of liquid into a reservoir, second piston means movable within said second chamber to insure that all liquid aspirated into the reservoir is discharged therefrom, means for actuating said first and said second piston means, said actuating means being movable between a discharge terminal and a second terminal remote therefrom, fixed stop means for arresting said actuating means at the discharge terminal, second fixed stop means for arresting said actuating means at the remote terminal, and valve means for closing said fluid passageway when said actuating means is arrested by said first fixed stop means and for opening said passageway when said actuating means is moving towards said first fixed stop means.

4. A pipette according to claim 3 wherein said means for actuating said piston means includes a common plunger means on which said first piston means and said second piston means are mounted for reciprocable movement.

5. A pipette according to claim 4 including spring means for biasing said plunger means to said second fixed stop means.

6. A pipette according to claim 3, including a second fluid passageway, said second passageway extending from said second chamber to the exterior of said pipette, means for sealing said passageway during the initial movement of said actuation means toward said first fixed stop means.

7. A pipette according to claim 6, including means providing a third fluid passageway from said second chamber to the exterior of said pipette during the terminal portion of the movement of said actuating means towards said first fixed stop means.

8. A pipette according to claim 7, wherein said valve means comprises spring biased check valve means, and said third passageway forming means allows said check valve means to close said fluid passageway between said first and said second chambers.

9. A pipette according to claim 6, wherein said means for actuating said first and said second piston means includes plunger means on which said second piston means is mounted for limited sliding motion, and wherein said second passageway extends through said second piston means, and wherein said sealing means is carried on said plunger means and is moved into sealing position when said plunger means is moved relative to said second piston means in a fluid expelling direction.

10. A pipette according to claim 9, including means mounted on said plunger means for engaging said second piston means shortly after said plunger means starts its return stroke from a fluid expelling operation, thereby moving said sealing means away from said second fluid passageway.

11. A pipette according to claim 10, wherein said plunger means is directly connected to said first piston means.

12. A pipette according to claim 10, wherein said first piston means is guided for movement between two limiting positions, spring means for biasing said first piston means to one of said limiting positions, and wherein said plunger means moves from one limiting position to an intermediate position wherein it engages said first piston means and, thereafter, in abutting relationship with said first piston means, to a second limiting position determined by said first stop means.

13. A pipette according to claim 3 wherein said second piston means comprises a disk member slideable within said second chamber between two limiting positions, means for providing an air-tight seal as said member slides within said second chamber, said second chamber having a by-pass around said seal means at both limits of travel of said disk member, whereby said second chamber is vented to the exterior of the pipette when said disk member is at its terminal positions within said chamber.

14. A pipette comprising, a housing assembly having a first chamber and a second chamber, a fluid passageway connecting said first and said second chambers, first piston means movable between a first and a second limiting position so as to displace a predetermined quantity of air in said first chamber and thereby control the quantity of liquid drawn by the pipette, plunger means movable between a first limiting position and a second limiting position for moving said first piston means to its second limiting position, fixed stop means for arresting said first piston means and said plunger means in their second limiting positions, additional fixed stop means for arresting said first piston means and said plunger means in their first limiting positions, spring means for biasing said first piston means and said plunger means to their first limiting positions, second piston means movable by said plunger means between a first and a second limiting position within said second chamber, said second piston means having a piston area substantially greater than the piston area of said first piston means, spring biased valve means normally closing said fluid passageway connecting said first and said second chambers but operable by air pressure in said second chamber when said second piston means approaches its second limiting position, and means providing an air passageway from said second chamber to the exterior of the pipette when said second piston means is at its first limiting position remote from said fluid passageway.

15. A pipette according to claim 14, including means providing an additional air passageway from said second chamber to the exterior of the pipette when said second piston means is at its other limiting position.

16. A pipette according to claim 14 wherein said plunger means is directly connected to said first piston means.

17. A pipette according to claim 14 wherein said additional fixed stop means comprises separate stop members for independently arresting said plunger means and said first piston means in their first limiting positions, and wherein said spring means comprises separate spring members for biasing said plunger means and said first piston means independently to their first limiting positions.

* * * * *